April 16, 1940.  E. J. W. RAGSDALE ET AL  2,197,708
CAR BODY
Original Filed April 5, 1934    9 Sheets-Sheet 3

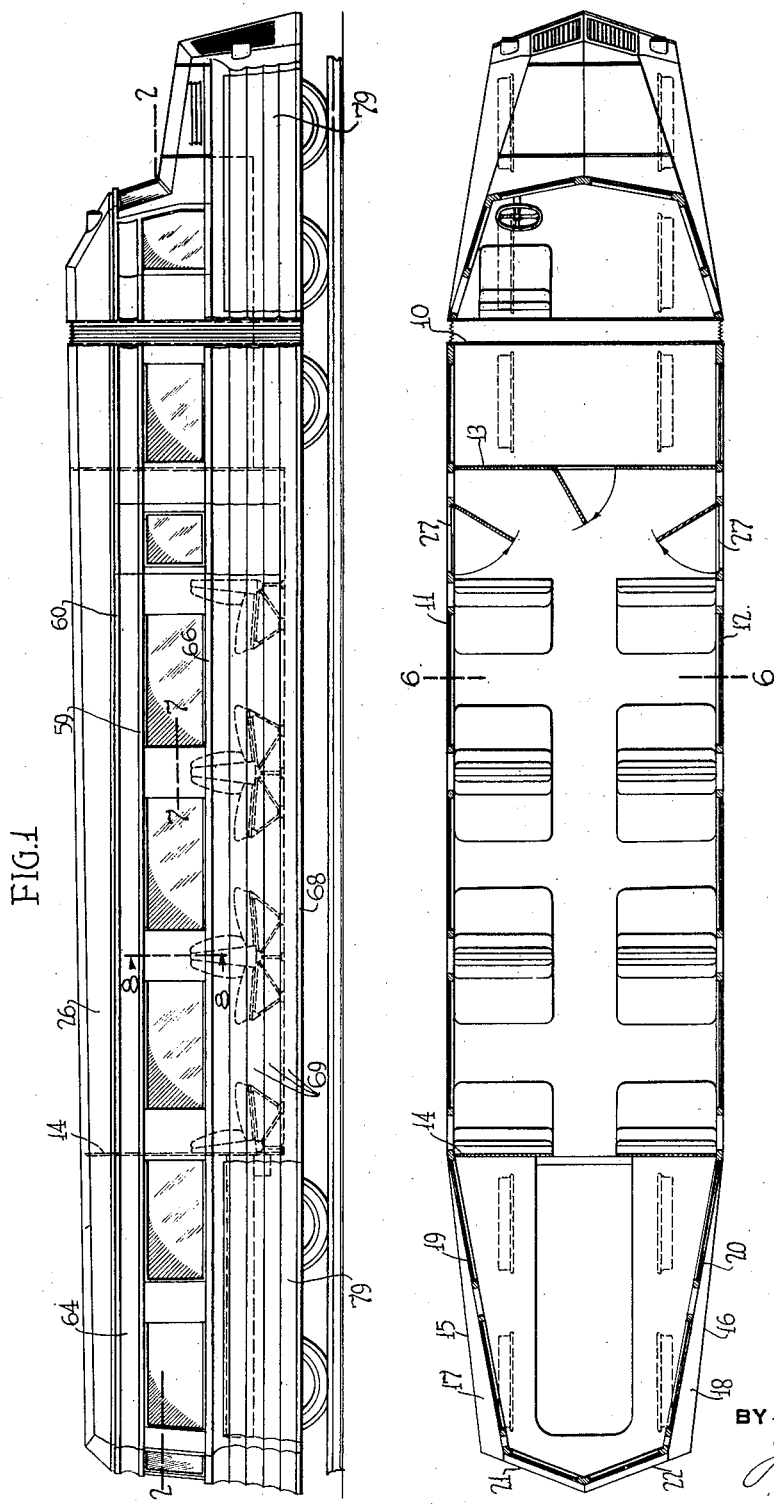

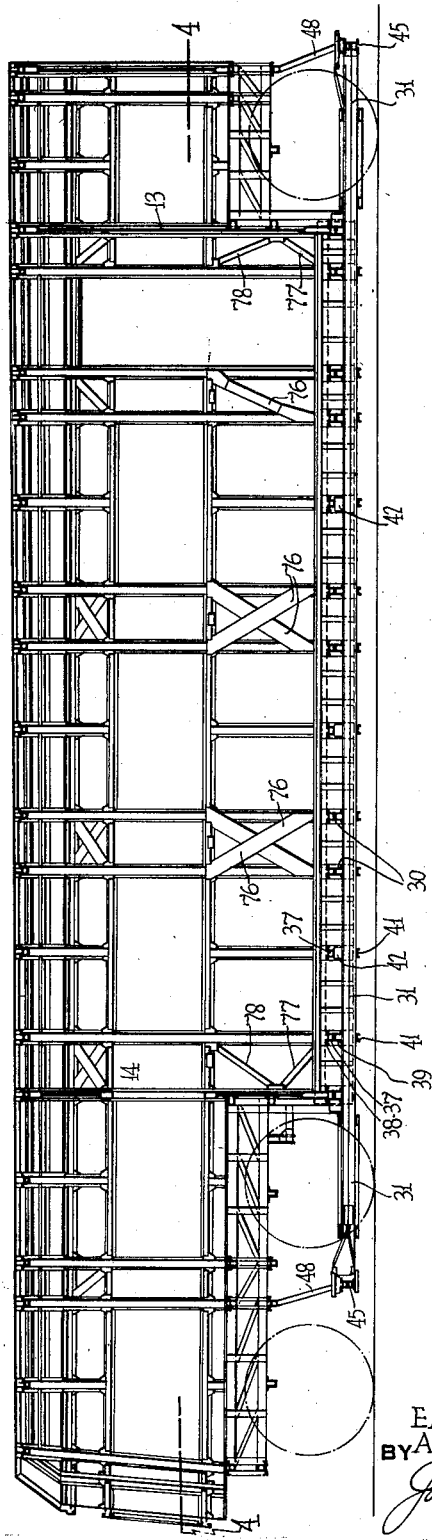

INVENTORS
EARL J.W. RAGSDALE
ALBERT G. DEAN.
BY
ATTORNEY.

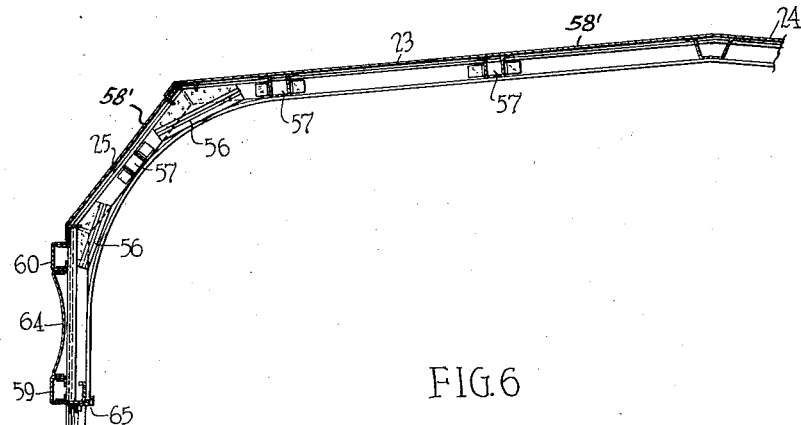
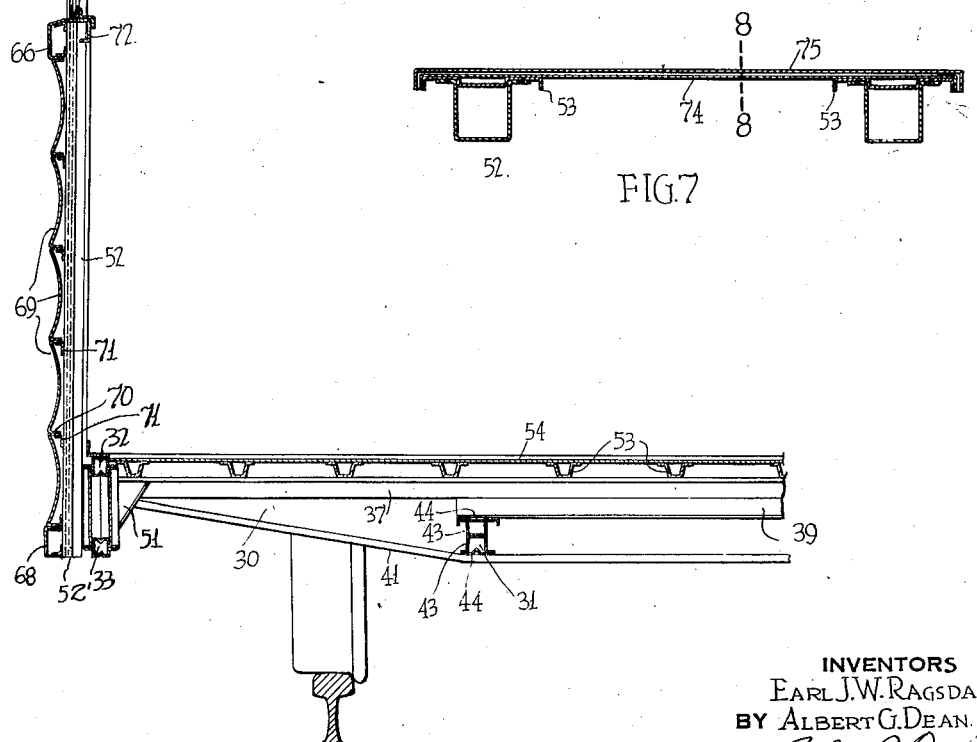

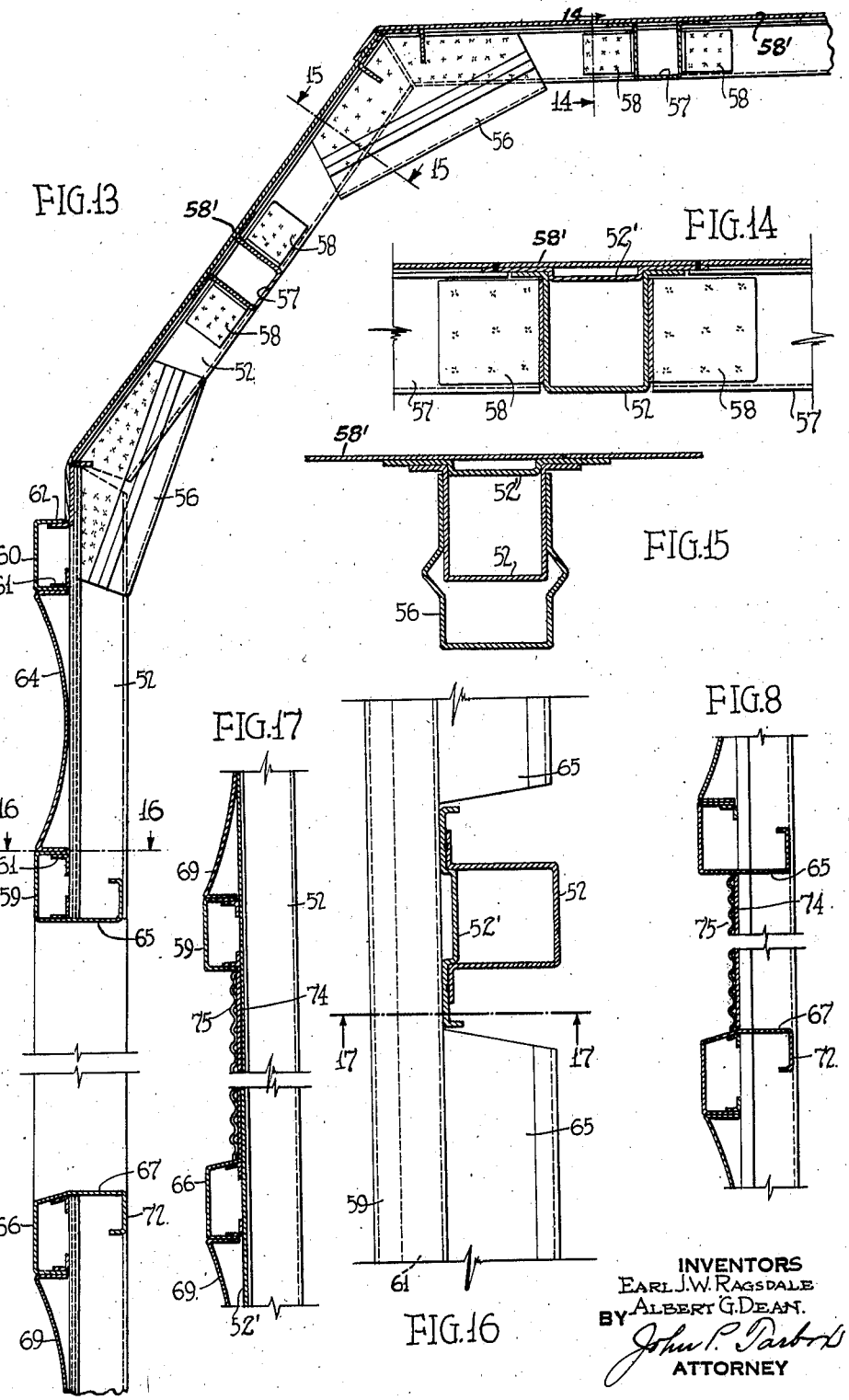

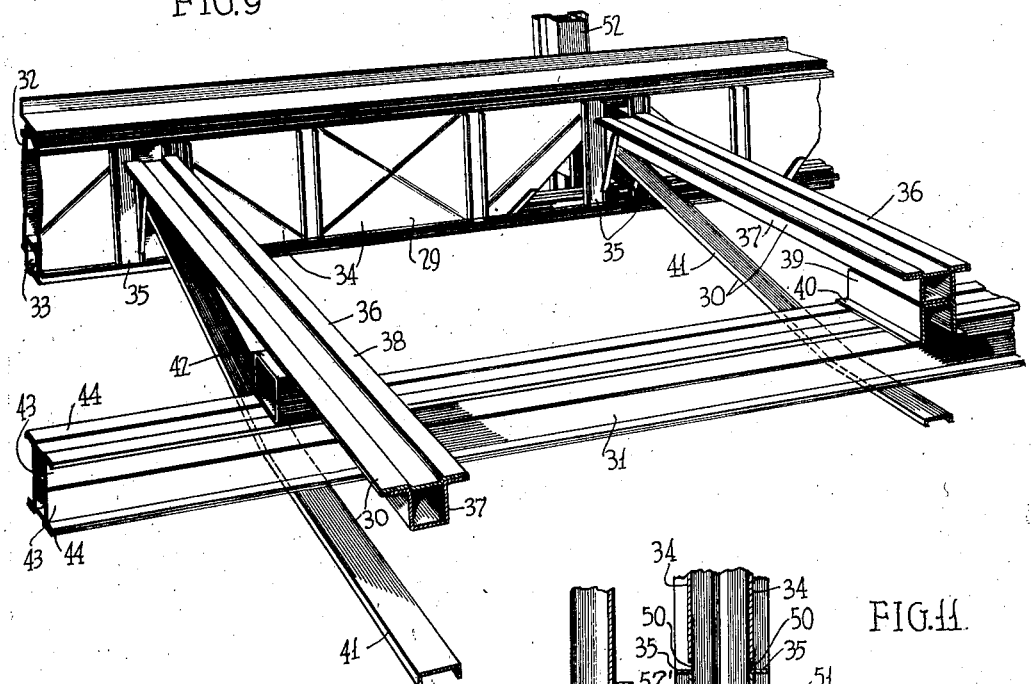

April 16, 1940.   E. J. W. RAGSDALE ET AL   2,197,708
CAR BODY
Original Filed April 5, 1934   9 Sheets-Sheet 9
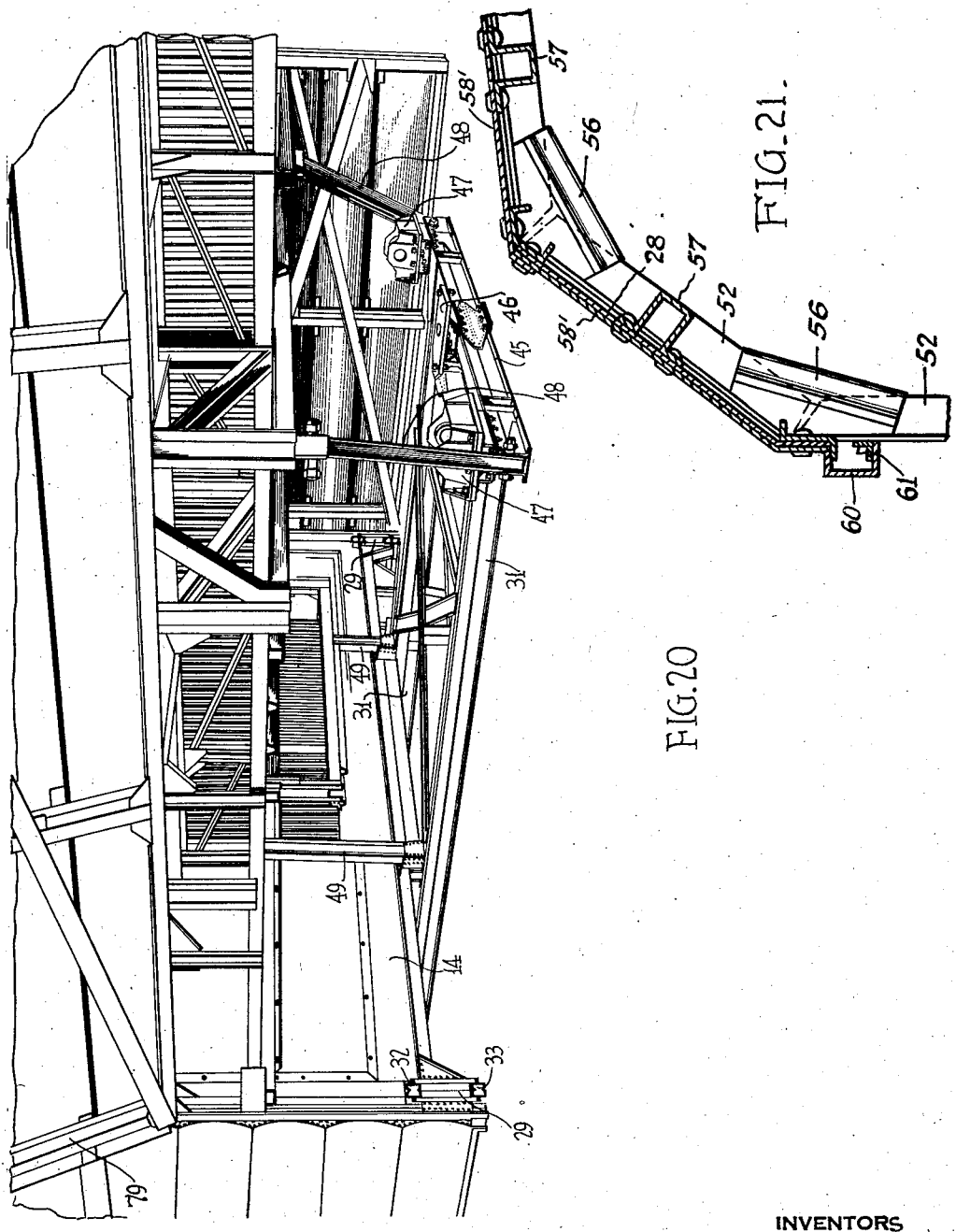
INVENTORS
EARL J.W. RAGSDALE
BY ALBERT G. DEAN
ATTORNEY Patented Apr. 16, 1940

2,197,708

UNITED STATES PATENT OFFICE 2,197,708

CAR BODY

Earl J. W. Ragsdale, Norristown, and Albert G. Dean, Narberth, Pa., assignors to Edward G. Budd Manufacturing Company, Philadelphia, Pa., a corporation of Pennsylvania Application April 5, 1934, Serial No. 719,072
Renewed October 18, 1938

29 Claims. (Cl. 105—397)

The invention relates to car body constructions and more particularly to car bodies adapted for passenger service and of such a light weight construction that they are many times lighter in weight than existing such bodies and may therefore be much more economically operated and operated with greater comfort to passengers, since they may, because of their light weight, be mounted on trucks having wheels equipped with rubber tires.

It is among the objects of our invention to provide a car body of this class which has better streamline characteristics than those heretofore proposed and in which these characteristics are attained without involving curvatures of a compound nature.

It is a further object of the invention to provide a construction in which the loads are more uniformly distributed and in which the parts entering into the structure are made to serve so far as possible several functions, whereby simplification and further lightening of the structure is attained.

It is a further object of the invention to constitute the roof structure as a main load carrying member of the body structure.

In constituting the roof a main structural member, made of framing interconnected by paneling forming in effect a plate girder or beam of deep U-form in cross section, extending from end to end of the car structure and down at the sides to the upper margins of the window openings. Where the girder so formed is cut by a door opening, it is suitably reinforced in the edges of the opening and for some distance therebeyond to carry the load through such reinforcement around the opening.

Other and further objects are ease of fabrication of the parts entering into the structure which is attained in large measure by reason of the fact that these parts are in the main rectilinear in form, and more readily formed than compound curved forms. Ease of assembly of the parts is another aim, and this is achieved by the formation of the parts so that the joints are readily accessible, and also by the assembly of the structure in sub-assemblies, which can be readily sub-assembled in jigs and then joined to each other in final assembly.

Extreme lightness and at the same time all the strength necessary to carry the loads is attained by the formation in large part of the parts entering into the structure of high tensile stainless steel, the frame members being generally of hollow channel section to permit openness of joints for ready connection, as by spot welding, and the channels are in many cases finally closed by cover strips to form box section members of added strength.

Another object is the simplification of the construction of the flooring and underframe to make it of light and economical construction, and this is attained by reason of the fact that the main loading is carried through the roof structure and also by the manner of assembly of the parts entering into the structure. Moreover, to carry the truck loads such as draft and buffing loads, into the body structure, the main longitudinal framing which is connected to the trucks is so tied in with the underframing and flooring as to distribute shocks transmitted thereto through the entire underframe and floor structure.

The main underframing of the body structure is suspended, very low, thereby providing a very low center of gravity and improving the riding qualities. The side walls of the body extend well down over the sides of the truck frames and wheels, and for ease of access to the said truck parts, are provided with readily movable panels adjacent the truck sides.

Other and further objects and advantages and the manner in which they are attained will be made known in the following detailed description of the invention when read in the light of the accompanying drawings, in which, Fig. 1 is a side elevational view of a rail car constructed in accordance with the invention.

Fig. 2 is a sectional plan view taken substantially on the line 2—2 of Fig. 1.

Fig. 3 is a sectional side elevational view, the section being taken approximately on the line 3—3 of Fig. 4 looking in the direction of the arrows.

Fig. 6 is a vertical transverse sectional view of approximately the left hand half of the car body, the section being taken approximately on the line 6—6 of Fig. 2.

Fig. 7 is a horizontal sectional view through the wall panel between adjacent window openings at approximately the location indicated by section line 7—7 of Fig. 1.

Fig. 8 is a detail sectional view taken on the line 8—8 of Fig. 7.

Fig. 9 is a fragmentary perspective view, on an enlarged scale and looking downwardly and outwardly, of the underframe and post assembly.

Fig. 10 is a fragmentary transverse sectional view on an enlarged scale of the underframe and post joint taken on the line 10—10 of Fig. 11.

Fig. 11 is a fragmentary horizontal sectional plan view taken substantially on the line 11—11 of Fig. 10.

Fig. 12 is a fragmentary perspective view of the underframe sub-assembly, looking downwardly and inwardly.

Fig. 13 is a fragmentary transverse sectional view through parts shown in the upper part of Fig. 6, but on an enlarged scale.

Figs. 14 and 15 are detail sectional views on an enlarged scale taken, respectively, on the lines 14—14 and 15—15 of Fig. 13.

Fig. 16 is a detail horizontal sectional view through a post carline taken in the plane indicated by the line 16—16 of Fig. 13.

Fig. 17 is a detailed vertical sectional view through the moulding and paneling adjacent a post carline as indicated by the line 17—17 of Fig. 16.

Figure 18:
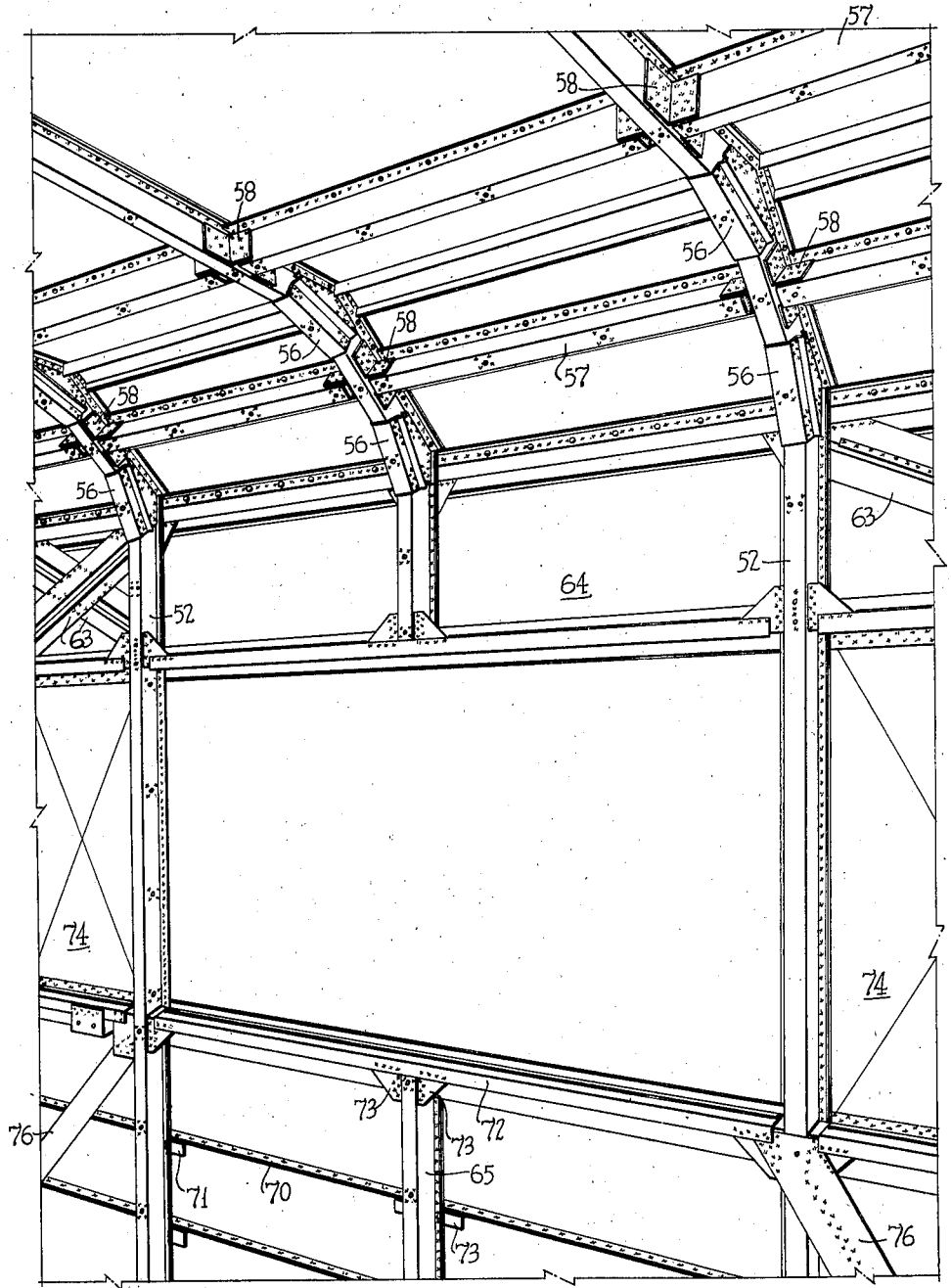

Fig. 18 is a perspective view of the side wall and roof of the car body structure in the region surrounding a window opening as seen from the inside.

Figure 19:
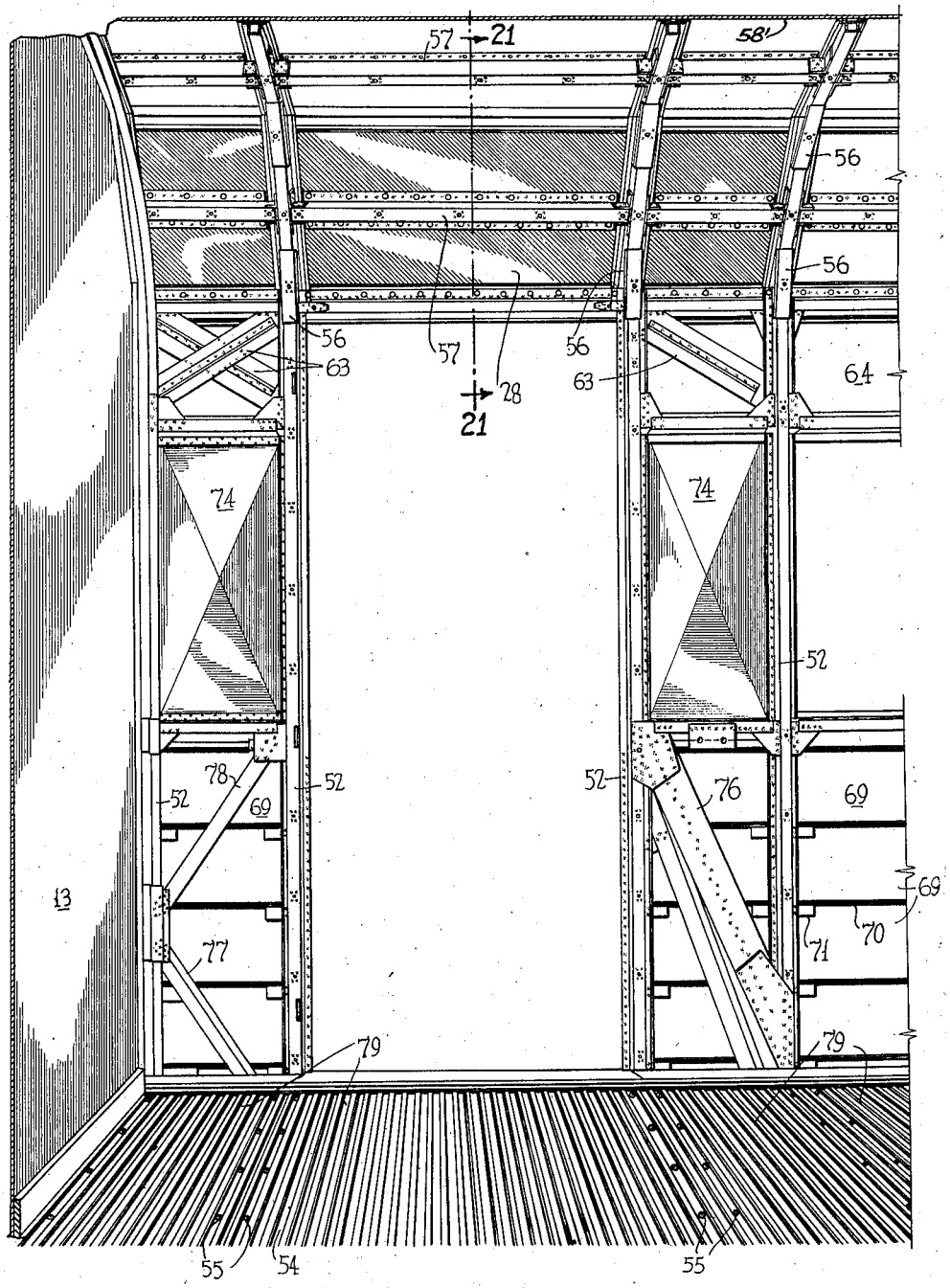

Fig. 19 is a similar view of a portion of the flooring, the side wall and roof of the car body structure in the region surrounding a door opening adjacent the front transverse bulkhead, the bulkhead being shown more or less schematically.

Fig. 20 is a perspective view showing the main underframe extension which connects with the truck and parts of the rear end structure rendered accessible, when the hinged side panel is in raised position, as shown in this view.

Fig. 21 is a fragmentary sectional view taken substantially on the line 21—21 of Fig. 19.

The rail car embodying the invention is shown in Figs. 1 and 2 of the drawings as being of generally streamline form to reduce air resistance, the streamline body thereof being supported on two swivelled trucks, the one, a four wheel truck supporting its rear end and the other, a six wheel truck supporting its front end and carrying a cab for the driver and the motor and driving transmission to the wheels. The side and top walls of the cab and main body run smoothly into each other, the movements between the cab and main body being permitted by the spacing between the rear transverse wall of the cab and the front transverse wall of the main body, which space between the side and top walls is bridged by a usual flexible bellows connection.

This invention is concerned more particularly with the construction of the main body of the car, and the detail description will therefore be confined thereto.

The main body, to carry out the streamline effect, but to facilitate fabrication out of substantially rectilinear structural elements, avoiding compound curves, is of generally prismatic or flat faceted form having in the instant case, as indicated clearly in Figs. 1 and 2, a flat front wall 10, generally flat parallel side walls 11 and 12 and transverse front and rear bulkheads 13 and 14 interconnecting and interbracing the side walls. In rear of said rear bulkhead, the side of the body tapers inwardly, the upper portions more than the lower, the lower portions being formed by relatively flat facets 15 and 16 extending from the bottom of the side wall almost to the bottom line of the windows where they merge through compound curved surfaces 17 and 18 into the upper flat faceted portions 19 and 20 extending to the roof and including the window openings. The sharply inturned downwardly and outwardly inclined facets 21 and 22 meeting in a line at the center complete the general streamline construction. The roof wall is likewise of faceted construction and is vertically of considerable greater depth at the front than at the rear, thus giving the roof a gradual downward and rearward inclination. The faceted construction of the roof is best shown in Figs. 1 and 6 in which the roof is seen to have two wide central facets 23 and 24 sloping gradually from the center to the sides and two narrower side facets 25 and 26 sloping more abruptly and joining up with the flat facets forming the side walls. This flat faceted construction materially improves the streamline characteristics of the car over the usual car forms without injecting into the structure the difficulties encountered in forming the framing and paneling which would be encountered in a true streamline form having compound curved walls. It is particularly advantageous where the structure is formed, in the main, as in the instant case, out of high tensile stainless steel parts, which can be readily formed in rectilinear elements of varying cross sections, but the formation of which into elements having compound curvature is relatively difficult, by reason of the high elasticity of the material.

High tensile stainless steel, particularly cold rolled stainless steel sheets containing in the neighborhood of 18% chromium and 8% nickel is, however, an ideal material to achieve the main objects of the invention, namely, extreme light weight combined with the necessary strength, by reason of the fact that exceedingly thin gauge such material, when formed in proper section, lends itself readily to joinder of the parts entering into the structure by spot welding, an exceedingly efficient method of joinder, and the parts entering into the structure may consist largely of rolled sections of any desired cross section which may be rolled from flat strips of almost any length, and cut to the desired lengths.

The general structural plan of the body according to the invention takes the form of a low swung trussed beam or girder having the upper portion of the body including the side walls above the window openings and the roof proper forming a deep inverted U-section beam constituting the main load carrying member of the body. This roof beam may be considered the main or compression chord of a Queen type of truss extending from substantially one end of the body to the other. The underframe or floor supporting structure between the transverse bulkheads 13 and 14, and the side wall structures adjacent and beyond said bulkheads toward the ends of the body form the tension chord of said truss, and the bulkheads themselves form the compression members of the truss between the chords. Between the bulkheads additional spaced post structures connect the upper and lower chords of the main body trussing.

Figure 4:
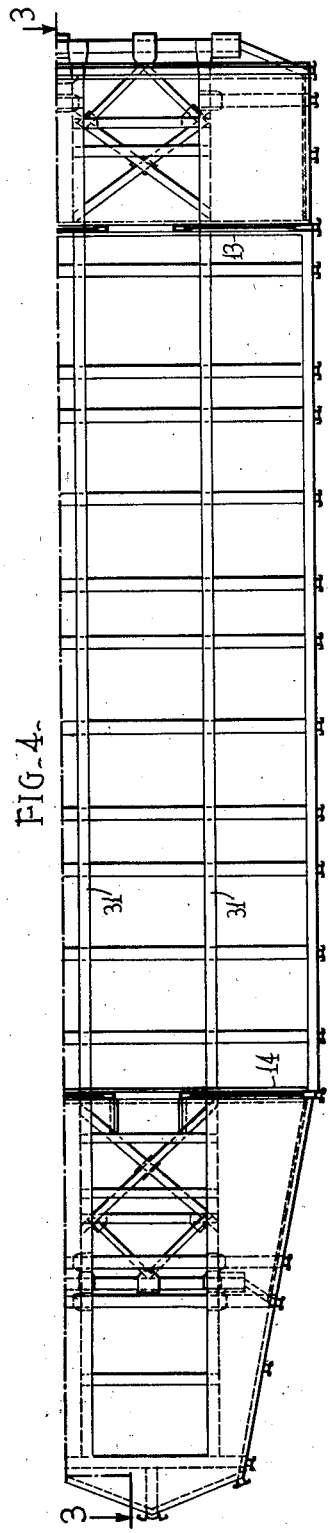
Fig. 4 is a sectional plan view of the greater portion of the width of the body taken approximately on the line 4—4 of Fig. 3.
Figure 5:
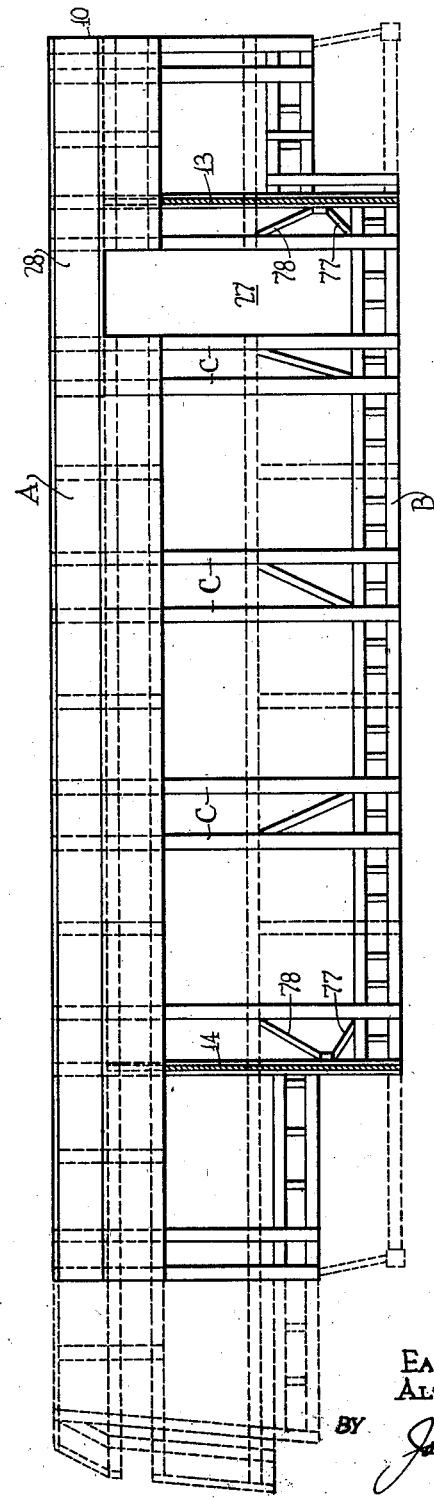
Fig. 5 is a more or less diagrammatic sectional side elevational view showing in full lines the main elements of the trussing of the improved body structure, omitting the subordinate elements or showing them in dotted lines.

All of this is most clearly apparent from an inspection of Fig. 5 in which the main truss structure is emphasized by the full lines, and the main elements are designated the top chord, as A, the bottom chord as B, the bulkheads, as 13 and 14 and the intermediate vertical post structures as 75

C. Where the top chord A is cut into by the door opening, as 27, it is reinforced above said opening by a metal sheet 28 extending from the top of the door opening up over the side of the roof and from some distance in rear of the door opening forwardly to the front end wall 10 of the body.

The underframe of the improved body construction designated generally by the letter B as is more clearly shown in Figs. 9 to 12 and Fig. 20 is a separate sub-assembly comprising as main elements thereof, side sills 29, 29 extending between the bulkheads 13 and 14, spaced transverse floor beams 30, interconnecting the side sills and main central longitudinal beams 31, 31 extending through the transverse floor beams and beyond the bulkheads for connection to the supporting trucks, not shown. The side sills are built up truss structures having upper and lower chords 32, 33 of box section form, each comprising two flanged channel members placed mouth to mouth with the flanges overlapping and spot welded together. The webbing interconnecting the chords may comprise web plates 34 and spaced channels 35 facing outwardly of the sill structure, the web plates 34 and the channels 35 being secured by spot welding them to the side walls of the inner channels of the chords 32, 33 before the chords are closed by welding the outer channels to the inner channels.

The transverse floor beams designated generally by the numeral 30 are of the Queen truss type comprising upper compression chords of box cross section comprising a flanged channel member 37 and a cover plate 38 welded to the flanges of the channel and forming the tops of the chords upon which the flooring rests and is secured. The central portions of certain of the chords 30 are reinforced by downwardly facing flanged channels 39 secured through their bottom walls to the bottom walls of the channels 37 and through their flanges, as 40, to the main central longitudinal beams 31, 31. The lower or tension chord of the transverse floor beams may comprise a shallow channel 41 passing under the central longitudinal beams and secured thereto and having its ends adjacent the side sills upwardly inclined, and meeting the upper or compression chord 37, 38. By this construction, with the main longitudinal beams 31 extending between the top and bottom chords of the transverse floor beams, they serve as structural elements of said beams, forming the compression members of the Queen type trusses comprising said transverse beams. Certain of the chords 37, 38 are not reinforced centrally by channels 39, 40, and in such cases, hollow section spacers 42 are inserted between the bottoms of the chords 37, 38 and the main longitudinal beams 31, 31 and secured thereto.

To facilitate the threading of the longitudinal beams 31, 31 between the chords of the transverse floor beams the lower chords 41 are left unconnected at one end until the beams have been brought in place.

The main longitudinal central beams, which serve among other things as draft and buffing load carrying and transmitting members, are according to the form of the invention shown of a double box section cross section formed by welding two flanged channels as 43, 43 back to back and closing the mouths of the channels by the cover strips, as 44, 44 welded to the flanges of the channels. This flanged construction facilitates the joinder of other members of the structure, such as the chords of the floor beams, thereto.

At their end portions, as most clearly shown in Figs. 3 and 20, they project beyond the main side sills and flooring structure under a raised flooring structure where the body extends over the trucks and are at their extreme ends interconnected by a transverse bolster beam 45. The bolster beam carries centrally a bracket 46 for receiving the trunnion in connecting it to the truck and at the sides brackets 47, 47 affording a link suspension from the truck frame which extends over the beams 31, 31. To transmit the vertical stresses into the raised flooring and body superstructure, the ends of the beams are connected with the latter by diagonal outwardly and upwardly extending struts 48, 48. Not only are the beams 31, 31 tied together at their extreme ends, but to additionally reinforce them and carry the longitudinal and vertical truck reactions into the body structure, they are interconnected in their extended portions by additional transverse and diagonal braces, see Fig. 20, and to the bulkhead and superstructure by the vertical posts 49 forming elements of the bulkhead structures.

Reverting to Figs. 9 to 12, it will be seen that the joint construction between the transverse floor beams and the side sills is such as to avoid cutting through the main strength members of the sills, the chords 32, 33, and provides common means whereby the sills, transverse floor beams, and the posts may all be secured together, the joint between these parts being open to permit joinder by spot welding.

To this end the side sill chords 32, 33 are joined at the joint locations by closely spaced pairs of channel web members 35 and a portion of the plate webbing 34 is removed as at 50 for greater accessibility for welding. The ends of the channels of the upper and lower chords of the transverse floor beams extend between the top and the bottom chords of a sill and are widened out in vertical direction by extensions thereof projecting from the outer side of the sill. The vertical widening and extension of the transverse floor beams is effected by a pair of gusset plates 51, 51 spot welded to the side walls of the channels 37 and 41 of the transverse floor beams and to the side walls of the channel webbing members 35 connecting the top and bottom chords of the sills. The portions of said gussets extending outwardly beyond the outer sides of the sills form final assembly joints, and a post carline, the main body of which is a flanged channel element 52 facing outwardly and closed to box section form by a cover strip 52' spot welded to the flanges of said channel, is secured thereto by telescoping the side walls of the channel 52 between the gussets 51, 51 and spot welding the parts together. As the projecting portions of the gussets are vertically of substantial depth, a strong joint between all the parts connected by these gussets is attained, since large overlapping surfaces are provided through which numerous welds may be made. The posts are additionally secured to the tops of the sills by angle members 32' having one arm overlapping the adjacent sill and secured thereto and the other arm secured to the post. This member extends through the length of the underframe and forms a side extension of the flooring.

The main underframe sub-assembly, as hereinbefore described, is further stiffened and reinforced and adapted to distribute the end thrusts on the main central beams 31, 31 connected to the trucks by the novel flooring structure, which is also of a maximum lightness consistent with the strength required. The flooring comprises longitudinal floor stringers closely spaced from each other and in the form of upwardly facing flanged channels 53 and secured to the flanges of the transverse floor beam chords 37, 38 which stringers are in turn overlaid by floor sheeting 54 having transverse corrugations of shallow depth and welded through the bottoms of the corrugations to the flanges of the floor stringers 53. The floor is completed by any suitable filler (not shown) such as cork composition filling the spaces between the corrugations of the sheet and extending some distance above the peaks thereof. For convenience of manufacture the flooring structure including the stringers and sheeting may be built up in suitable unit sections of any desired length, which units are assembled with the underframe by securing them through the bottoms of the corrugations of the sheeting and through the stringers to the edge flanges of the chords 37, 38, as by bolts indicated at 55, Fig. 19.

The superstructure comprises as the main frame elements thereof the transversely extending carlines including post portions 52, 53' as already described extended inwardly at the top and across the roof to form the roof carlines and downwardly on the opposite side of the body to form the post carlines on that side. These transverse frame structures are sub-assembled as units and are of the same general box section throughout as in the post regions. They are built up of rectilinear units having their abutting ends where the body wall passes from one flat facet into the other secured together as indicated in detail in Figs. 13 and 14 by a deep channel section gusset 56 the side walls of which are stiffened by pressed out ribs and overlapping through extensive areas the side walls of the channels 52 forming the adjacent carline sections and spot welded thereto in said overlap.

These transverse frame sub-assemblies are in the present construction arranged in pairs extending across the superstructure on opposite sides of the doorway and window openings, and are connected together in the roof region by longitudinally extending purlines 57 of outwardly presenting flanged channel section having their ends abutting the side walls of the channels 52 of the carlines and secured thereto through angle gussets 58 spot welded to the side walls of the carlines and purlines, respectively. The roof section is completed by the roof sheeting 58' which is applied to the outer faces of the carlines and purlines in overlapping sections and secured to the flanges of both carlines and purlines to form of the roof portion a deep U-section plate girder which forms the main strength member. In fact, the upper portions of the sides of the body above the window openings also form a part of this girder or beam, since the moulding strips 59 and 60 which extend continuously from end to end of the car body except in the region of the door opening where the upper strip 60 alone is unbroken, and comprise inwardly facing channels secured by angle brackets, as 61, and a Z-section roof rail, all tie the carlines together and form with the diagonal braces 63 (Fig. 19) and the curved paneling section 64, a trussed structure. Above the window openings the moulding strip 59 is extended inwardly as at 65 between the post carlines to form the top framing of the window. Such inward extension may also extend between the posts in other regions, as shown in Fig. 8.

Along the bottoms of the window openings an inwardly facing channel section moulding strip 66 extended inwardly at 67 and forming the window sills is secured to the post carlines in a manner similar to the moulding strip 59 and between this moulding strip and the bottom moulding strip 68, the outer paneling is applied in the form of concave panel strips 69 secured together and to the moulding through edge flanges 70 and the edge flanges in turn secure the paneling to the posts through the angle brackets 71.

Between the sides of the window openings, a short post carline similar to the main post carlines is provided but terminating at the window sill and secured to the downwardly extending flange 72 on the window sill 67 through angle gussets 73 (Fig. 18) spot welded thereto. Similarly a short carline extends from the central portion of the top of a window opening across the top to the top of a window opening on the opposite side of the car body, this short carline being connected to the purlines and roof sheeting in the manner already described above, as is readily seen from an inspection of Fig. 18. The pair of post carlines 52, 52 between the window openings are interconnected by a sheathing comprising, as shown in Figs. 7 and 8 a flat sheet 74 secured to the flanges of the posts and having inturned edge flanges combined with an outer decorative corrugated sheet 75 which matches with the sheet 74 and is secured thereto to form the finish between window openings.

To form a stiffer truss structure below the window openings, the pair of posts are interconnected as is clear from Figs. 3, 18 and 19 and by diagonal braces 76 which are so arranged that they may take all the load required of them in tension, and hence can be flat sheets spot welded either directly or through flat gussets to the post structures.

Between the post carlines adjacent a bulkhead, braces 77 and 78 are extended respectively from the floor and window line of the post to an intermediate portion of the post forming a part of the bulkhead construction. The braces assisting in carrying the tension stresses of the lower floor structure beam B through the bulkhead into the side wall structure of the extension of the body beyond the bulkhead and to the main roof beam A.

The raised floor and superstructure of the end portions of the body beyond the bulkheads and over the trucks is generally similar to the structure in the main central portion of the body already described, and further detailed description is believed unnecessary. The side paneling and posts in said extensions are supported by suitable connections to the raised trussed floor framing.

The paneling in the regions laterally of the trucks is removable as indicated by the panel 79, Fig. 20, which is hinged at its upper edge to the fixed paneling, and when in normal position masks the trucks and their connection to the main body laterally and forms a continuation of the fixed paneling, but may be swung up as shown to expose the trucks adjacent thereto and permit ready access thereto.

A vehicle body having its elements of the forms and shapes shown or their equivalents, and so combined as between the elements themselves and as between sub-assemblies of those elements constituting units, enables the construction through rolled and drawn sections of substantially rectilinear form in most part from stainless steel strips and sheets, and the joinder together in large part of the elements and sub-assemblies by spot welding, and the body so constructed possesses in a very high degree the features which constitute the main objects of the invention, among them a very high strength-weight ratio and capability of fabrication in substantially streamline form out of elements of substantially rectilinear form.

While we have shown and described but one form of the invention, it will be understood that it is susceptible of many embodiments without departing from the generic spirit of the invention, and such other embodiments we intend to include within the scope of the appended claims.

What we claim is:

1. A car body frame comprising side sills having upper and lower chords and interconnecting webbing, transverse floor beams, posts at the outer sides of said sills, the sides of said transverse beams being extended through the webbing of the sills and into overlapping relation with the opposite sides of the posts and secured to both posts and sills, thereby providing common means for interconnecting the beams, sills and posts.

2. A car body frame comprising side sills having upper and lower chord members and interconnecting webbing, transverse floor beams having their ends terminating at said sills and posts at the outer sides of the sills opposite the ends of said floor beams, and a common gusset plate extending between the chords of one of said side sills and interconnecting said sill, one of said floor beams and one of said adjacent posts.

3. A car body frame comprising a side sill having upper and lower chord members and interconnecting webbing including closely spaced angular section members, plate gussets extending beyond the outer and inner sides of said sills and between the chords and secured, respectively, to the closely spaced angular section members of said webbing, a post received between the outer ends of said gussets and secured thereto and a transverse floor beam received between the inner ends of the gussets and secured thereto.

4. A car body frame comprising a sheet metal side sill having angular section upper and lower chord members and interconnecting webbing including pairs of closely longitudinally spaced angular section sheet metal members secured to the opposite sides of said hollow chord members, a pair of gusset plates passing between said chord members and projecting on the opposite sides thereof, and an angular section sheet metal post and an angular section sheet metal floor beam, respectively, received between the outer and inner projecting portions of said gusset plates and secured thereto.

5. A car body frame comprising an underframe sub-assembly including sheet metal side sills of truss form having upper and lower chords and longitudinally spaced transverse floor beams having their side walls adjacent their ends extended by vertically widened extensions passing between the top and bottom chords of said side sills, secured to said sills and projecting some distance from the outer faces of the sills, and sub-assembled arched car-line structures, each including a continuous hollow section frame member extending from one sill up one side of the body across the roof and down the other side to the other sill, the lower ends of said structures being received in final assembly between the widened extensions of the side walls of the floor beams and secured thereto.

6. A car body frame comprising an underframe sub-assembly including sheet metal side sills of truss form having upper and lower chords and longitudinally spaced transverse floor beams having their side walls adjacent their ends extended by vertically widened extensions passing between the top and bottom chords of said side sills, secured to said sills, and projecting some distance from the outer faces of the sills to form final assembly joint structures for securing carline posts thereto.

7. A car body construction having windows in its side walls and comprising a trussed top structure in transverse section of relatively deep downwardly presenting U-form terminating at the sides in the top margins of the windows and extending substantially from end to end of the car, said structure comprising transverse carlines and longitudinal purlines interconnected by continuous metallic sheathing and forming a main strength beam for the body.

8. A car body construction supported adjacent its ends by swivelled trucks, having a truss structure substantially of the Queen truss type, including a roof structure of relatively deep downwardly presenting U-form in transverse section forming the main beam of the truss, an underframe supporting the flooring, and connected at its ends by vertical and diagonal trussing to the roof structure and forming the tension member of the truss, and transverse bulkheads adjacent the front and rear of the body extending between the roof and underframe and forming compression members of the truss.

9. A car body having window openings in its side walls and construction comprising a roof structure forming a main strength supporting beam, in transverse section of relatively deep U-form and terminating at the sides in the top margins of the window opening, one side of the U being cut into by a doorway opening extending above the top margins of the window openings, of means reinforcing the framing flanking said doorway opening including a flat plate reinforce additional to the roof sheathing extending across the top of the door and from the top of the door opening a substantial distance up over the side of the roof and tying into the roof framing on either side of the doorway opening thereof.

10. A rail car body of generally streamline form having at least one end thereof tapering to a gradually reduced cross section, the side walls and end of said car being constituted of substantially flat facets, each built up of framing and paneling comprising elements of generally rectilinear form.

11. In a vehicle body, an underframe comprised of longitudinal side sills of truss type transversely upwardly presenting flanged channel section beams between said side sills, stringers comprising longitudinally extending upwardly presenting flanged channel sections secured to the beams by connection of their bottoms with the flanges of the beams and means to integrally secure said side sills to said transverse beams whereby longitudinal and transverse stresses are distributed throughout the underframe.

12. A truss type car body construction of the type described and adapted to be mounted on trucks adjacent its ends and having windows in its side walls, which comprises a trussed top structure, in transverse section of relatively deep downwardly presenting U-form, terminating at the sides in the top margins of the windows and extending substantially from end to end of the car, said structure comprising transverse carlines and longitudinal purlines interconnected by continuous metallic sheathing, said top structure forming the compression chord and a main strength beam for the body.

13. A truss type car body construction comprising a roof structure forming a main strength supporting beam, said roof being of relatively deep U-form in transverse section and forming the longitudinal compression chord of the body, said roof having transverse carlines and longitudinal purlines, one edge of the roof structure being cut away for a doorway opening extending into the edge thereof and intersecting a part of the chord, and means to reenforce the roof structure adjacent said doorway opening including a curved flat plate extending across the top of the doorway opening and extending a substantial distance over the roof structure and tying into the roof framing on either side of the doorway opening, and a continuous metallic roof sheathing in addition to the plate reenforcement joining the transverse carlines and longitudinal purlines of the roof structure.

14. A truss type car body construction of the type described adapted to be mounted on trucks adjacent its ends, comprising a roof structure forming a main strength supporting beam, said roof being of relatively deep U-form in transverse section and forming the principal compression chord of the body, said roof having transverse carlines and longitudinal purlines, one edge of the roof structure being cut away for a doorway opening extending into the edge thereof and intersecting a part of the chord, and means to reenforce the roof structure adjacent said doorway opening and extending a substantial distance over the roof structure and tying into the roof framing on either side of the doorway opening, and a continuous metallic roof sheathing in addition to the plate reenforcement joining the transverse carlines and longitudinal purlines of the roof structure, said doorway being located between the points of support.

15. A beam type skeleton frame for a vehicle body comprising in transverse plane a post, carline, and floor beam forming a closed transverse figure, means to join adjacent carlines and means to join the adjacent floor beams whereby the carlines and their joining means and floor beams and their joining means serve as rigid longitudinal members of a truss, said posts serving as struts, means to support the car body adjacent its ends, and transverse bulkheads intermediate of the carlines and floor beams, and located between the points of support serving as compression members of a Queen truss in which the carline joining means serve as compression chord members and the floor beam joining means, carline joining means, and posts adjacent to and beyond the bulkheads serve as tension chord members.

16. A car body of the truss type adapted to be supported adjacent its ends and having, in transverse section, a relatively deep downwardly presenting U-form roof constituting the principal compression chord of the truss, and having doorways between the points of support intercepting portions of a truss member, and means to reenforce the intercepted part of the truss to transmit loads from the section of the truss on one side of the doorway to the section on the other through portions of the body inwardly removed from the sides thereof, such reenforcing means comprising beams and transverse connecting members.

17. A truss type car body underframe for light weight rail cars comprising vertically relatively deep trussed side sills, and longitudinal beams spaced inwardly of the sills and from each other, continuous transverse trusses interconnecting said side sills at spaced longitudinal points and having their top faces below the top faces of the sills forming the floor sides and arranged to receive the flooring stringers, and flooring on said stringers, with its top face aligned with the tops of the sills, said longitudinal beams intersecting but not interrupting said transverse trusses and forming rigid structural elements of said transverse trusses, all of said parts being constructed of relatively light gauge sheet metal integrally secured together.

18. A car body construction of truss type having a roof, side sills, and an underframe and posts joining said side sills and said roof, said roof being a compression chord element, and the underframe and side sills being a tension chord, said underframe including transverse floor beams extending between and secured to said side sills and means to form a rigid structure of said floor beams for distribution of stress reactions throughout the underframe including longitudinally extending stringers secured to said floor beams, transversely corrugated flooring secured to said stringers and giving additional transverse rigidity to said underframe between said floor beams and a longitudinally extending draft and buffing load absorbing member secured to said floor beams.

19. A car body construction of truss type having a roof, side sills, and an underframe and posts joining said side sills and said roof, said roof being a compression chord element, and the underframe and side sills being a tension chord, said underframe including transverse floor beams extending between and secured to said side sills and means to form a rigid structure of said floor beams for distribution of stress reactions throughout the underframe including longitudinally extending stringers secured to said floor beams, transversely corrugated flooring secured to said stringers and giving additional transverse rigidity to said underframe between said floor beams and a longitudinally extending draft and buffing load absorbing member secured to said floor beams, said draft and buffing load absorbing member including a channel shape member secured to the underportion of the respective floor beams, said floor beams being transversely trussed by chord members extending under said longitudinally extending draft and buffing load absorbing member.

20. A light weight vehicle body longitudinally and transversely trussed and including a roof truss having transversely extending carlines and longitudinally extending webbing between the carlines, an underframe truss having transversely extending floor beams each of Queen post truss construction, and transversely corrugated flooring supported on and integrally secured to said floor beams and reenforcing the underframe between the floor beams, and side frame trusses including side sills and rigid posts extending between the side sills and the roof structure the floor beams being secured to the side frame posts, said underframe serving as a tension chord member of the body truss.

21. A truss type car body for light weight rail cars comprising a roof having transverse carlines and longitudinally extending webbing serving as a truss element, a side frame construction including trussed side sills and posts connecting said side sills with said roof, and an underframe including floor beams secured to said side sills and forming a truss element, said underframe including longitudinally extending stringers secured to and tying together said floor beams, and transversely corrugated flooring secured to and tying together said stringers and forming said underframe into an integral structure, and a draft and buffing load member secured to said floor beams, said underframe being a body truss element and adapted to transmit draft and buffing reactions into the car body.

22. A car body frame comprising an underframe sub-assembly including sheet metal side sills of truss form having upper and lower chords, and longitudinally spaced transverse floor beams having their side walls adjacent their ends extended by extensions passing between the top and bottom chords of said side sills and secured to said sills and projecting some distance from the outer faces of the sills, and arched carline structures, each including a hollow section frame member extended from one sill up one side of the body across the roof and down the other side to the other sill, the lower ends of said structures being received in final assembly in abutting relation with the extensions of the side walls of the floor beams.

23. A light weight, high strength truss type rail car body comprising a roof, sides, ends and underframe which constitute the truss, the underframe being adapted to serve as a stress distributing element and including sheet metal floor beams extending transversely of the car body and having a substantial overlap through which they are secured to the sides, longitudinally extending closely spaced angular cross section sheet metal stringers overlapping and secured to the respective floor beams across the top edges thereof, and a sheet metal floor plating overlapping and secured to said stringers, said floor plating being corrugated, the corrugations of the floor plating between the floor beams additionally strengthening the underframe intermediate the floor beams, the overlapping parts of said underframe being integrally welded together in their overlapping regions and to the car body sides whereby to constitute the underframe as a whole, a lightweight shear panel of the width of the body well adapted to take and distribute the draft or buffing loads throughout the underframe and into the sides of the body.

24. A light weight, high strength truss type rail car body comprising a roof, sides, ends and underframe which constitute the truss, the underframe being adapted to serve as a stress distributing element and including floor beams extending transversely of the car body and being secured to the sides, longitudinally extending angular cross section stringers secured to the respective floor beams across the top edges thereof, and a floor plating secured to said stringers, said floor plating being corrugated, the corrugations between the floor beams additionally strengthening the underframe intermediate the floor beams, and longitudinally extending draft and buffing load reacting members secured to said floor beams whereby draft and buffing loads are distributed throughout the underframe, the body sides being so proportioned with respect to the draft and buffing load reacting members that substantially all bending is taken by the sides.

25. In a railway car the body structure of which consists of bar-work or frame-work, longitudinally extending side wall trusses of slight height having the upper chords thereof positioned entirely below the continuously extending window openings, upwardly extending non-flexible members rigidly secured to the ends of the side wall trusses, and a compression- and collapse-resisting roof structure connected to the upper ends of said members to provide a stress-carrying element of the body structure.

26. In a railway car the body structure of which consists of bar-work or frame-work, longitudinally extending side wall trusses located entirely below the window openings of the car, a compression- and collapse-resisting roof structure, and upwardly extending members rigidly secured to said trusses and connecting said roof structure thereto.

27. In a railway car the body structure of which consists of bar-work or frame-work, longitudinally extending side wall trusses of slight height having the upper chords thereof positioned entirely below the continuously extending window openings, upwardly extending non-flexible members rigidly secured to the ends of said side wall trusses, and a compression- and collapse-resisting roof structure inflexibly connected to the upper ends of said members to provide a stress-carrying element of the body structure.

28. A light weight, high strength truss type rail car body comprising a roof, sides, ends and underframe which constitute the truss, the underframe being adapted to serve as a stress distributing element and including floor beams extending transversely of the car body and being secured to the body sides, longitudinally extending angular cross section stringers secured to the respective floor beams across the top edges thereof, a floor plating secured to said stringers, said floor plating being transversely corrugated, the corrugations between the floor beams additionally strengthening the underframe intermediate the floor beams, and a draft and buffing load member secured to the floor beams.

29. A light weight vehicle body longitudinally and transversely trussed and including trussed side walls having posts, a roof truss having transversely extending carlines connecting the posts of the side wall trusses, and longitudinally extending webbing between the carlines, and an underframe truss including floor beams secured at their ends to said posts of the side wall trusses, said underframe including longitudinally extending stringers secured to and tying together said floor beams, transversely corrugated flooring secured to and tying together said stringers, and a draft and buffing load member secured to said floor beams, said underframe being a body truss element and adapted to transmit draft and buffing reactions into the car body.

EARL J. W. RAGSDALE.
ALBERT G. DEAN.